US008511170B2

(12) United States Patent
Liu et al.

(10) Patent No.: US 8,511,170 B2
(45) Date of Patent: Aug. 20, 2013

(54) PRESSURE TRANSDUCER HAVING STRUCTURE FOR MONITORING SURFACE CHARGE

(75) Inventors: Lianjun Liu, Chandler, AZ (US); Chad S. Dawson, Queen Creek, AZ (US); Bernhard H. Grote, Phoenix, AZ (US); Woo Tae Park, Singapore (SG)

(73) Assignee: Freescale Semiconductor, Inc., Austin, TX (US)

( * ) Notice: Subject to any disclaimer, the term of this patent is extended or adjusted under 35 U.S.C. 154(b) by 492 days.

(21) Appl. No.: 12/949,356

(22) Filed: Nov. 18, 2010

(65) Prior Publication Data

US 2012/0125113 A1    May 24, 2012

(51) Int. Cl.
*G01L 9/06* (2006.01)

(52) U.S. Cl.
USPC .............................. 73/721; 73/715; 361/283.4

(58) Field of Classification Search
None
See application file for complete search history.

(56) References Cited

U.S. PATENT DOCUMENTS

| | | | |
|---|---|---|---|
| 4,592,229 A * | 6/1986 | Butefisch et al. ............... 73/147 |
| 5,074,152 A | 12/1991 | Ellner et al. |
| 5,231,301 A | 7/1993 | Peterson et al. |
| 7,192,819 B1 * | 3/2007 | Padmanabhan et al. ....... 438/197 |
| 7,219,554 B2 * | 5/2007 | Fujimoto et al. ................ 73/754 |
| 7,258,018 B2 | 8/2007 | Kurtz et al. |
| 7,882,740 B2 * | 2/2011 | Okada ............................ 73/511 |
| 8,136,385 B2 * | 3/2012 | Adams et al. ................ 73/31.05 |

OTHER PUBLICATIONS

Betzner, T.M., "Charge Transfer to MEMS Pressure Sensors by Glow Discharge Plasmas", IEEE, Journal of Microelectromechanical Systems, vol. 15, No. 5, Oct. 2006, pp. 1392-1397.

* cited by examiner

*Primary Examiner* — Lisa Caputo
*Assistant Examiner* — Jermaine Jenkins
(74) *Attorney, Agent, or Firm* — Ingrassia Fisher & Lorenz, P.C.

(57) ABSTRACT

A pressure transducer includes a substrate, a piezoresistive element, a first conductive element, a first terminal, and a test structure. The substrate has a surface and a cavity. A diaphragm layer is formed over the cavity and over the surface of the substrate. The piezoresistive element is formed in the diaphragm layer. The first conductive element is formed in the diaphragm layer, and has a first conductivity type. The first conductive element is coupled to the piezoresistive element. The first terminal is formed over a surface of the diaphragm layer and coupled to the first conductive element. The test structure has the first conductivity type and is formed in the diaphragm layer. The test structure has an edge spaced apart from an edge of the first conductive element by a predetermined distance. A surface charge accumulation on the diaphragm layer is detected using the test structure.

20 Claims, 5 Drawing Sheets

PRESSURE TRANSDUCER HAVING STRUCTURE FOR MONITORING SURFACE CHARGE

BACKGROUND

1. Field

This disclosure relates generally to pressure transducers, and more specifically, to a pressure transducer having a structure for monitoring surface charge.

2. Related Art

Micro electro-mechanical systems (MEMS) components are used in a wide variety of applications. MEMS components are typically fabricated on semiconductor wafers using standard integrated circuit fabrication equipment. One type of MEMS component is a pressure transducer, or sensor. A MEMS pressure transducer is generally made by providing a substrate with a thin flexible diaphragm over a cavity. One or more piezoresistive elements are oriented on the diaphragm and electrically connected in, for example, a bridge configuration. The piezoresistive elements in the bridge change their resistance values in response to a bending of the diaphragm caused by pressure changes and thereby convert the sensed pressure to a corresponding electrical output signal such as a voltage or resistance. The surface of the diaphragm may be protected with a flexible material. However, during fabrication, packaging, handling, testing and field usage of the pressure transducer, a surface of the pressure transducer may become charged for various reasons before the flexible material is applied. Also, the sensor may be exposed to harsh environmental conditions that can apply a surface charge to the pressure sensor. The surface charge may form an inversion channel between conductive elements that contribute parasitic field effect transistor (FET) type leakage currents to the total current through the bridge. These parasitic FET contributions can induce changes in the operation of the piezoresistive elements, causing a shift of the output signal, and resulting in erroneous pressure readings without any indication to a user.

Therefore, what is needed is a pressure transducer that includes a structure for detecting accumulated surface charge.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
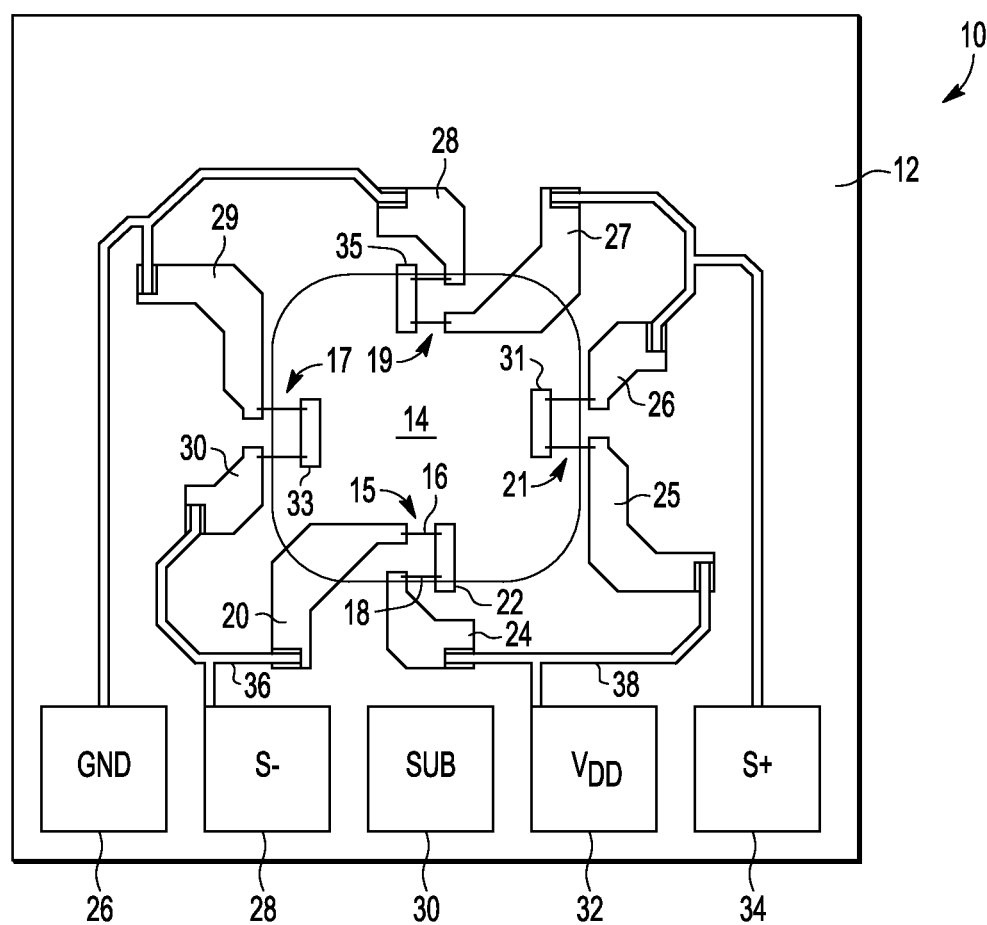
FIG. 1 illustrates a top down view of a prior art pressure transducer.

Generally, there is provided, a pressure transducer using piezoresistive elements formed in a moveable diaphragm on a semiconductor substrate. Conductive elements are P+ areas implanted with a high concentration of P type impurities in the diaphragm material for connecting the piezoresistive elements to output terminals. A P+ test structure is formed outside of the diaphragm region of the pressure transducer and close to one of the P+ conductive elements to form a P-type metal oxide semiconductor (PMOS) charge test device. Accumulated charge on the pressure transducer will cause a channel to be formed in the semiconductor material between the P+ conductive element and the P+ test structure. A current through the PMOS charge test device is measured to determine a level of surface charge contamination. A higher level of contamination will cause a higher current, or lower resistance path. In particular, if the charge is sufficient to form an inversion channel, a strong increase in current for increasing surface charge concentration will be observed around this threshold. The P+ test structure can be fabricated together with the piezoresistors and conductive elements and no additional process steps are required. In one embodiment, the measured current or resistance of the PMOS charge test device can be compared to a tolerance level to detect if the pressure transducer is operational or faulty. A size and shape of the test structure can be changed to adjust a sensitivity of the charge detection. Additionally, in another embodiment, more than one test structure can be formed on a pressure transducer.

In one embodiment, there is provided, a pressure transducer comprising: a substrate having a surface and a cavity, a diaphragm layer formed over the cavity and over the surface of the substrate; a piezoresistive element formed in the diaphragm layer; a first conductive element formed in the diaphragm layer, the first conductive element having a first conductivity type, and the first conductive element coupled to the piezoresistive element; a first terminal formed over the surface of the diaphragm layer and coupled to the first conductive element; and a test structure having the first conductivity type and formed in the diaphragm layer, the test structure having an edge spaced apart from an edge of the first conductive element by a predetermined distance, wherein a surface charge accumulation over a surface of the diaphragm layer is detected using the test structure. The first conductivity type may be a P+ conductivity type. The pressure transducer may further comprise a second terminal coupled to the test structure, wherein a change in resistance between the first terminal and the second terminal may be used to indicate the surface charge accumulation. The pressure transducer may further comprise: a plurality of piezoresistive elements formed in the diaphragm layer; and a plurality of conductive elements for electrically connecting the plurality of piezoresistive elements in a resistive bridge configuration. The plurality of piezoresistive elements may comprise a plurality of pairs of piezoresistive elements. The substrate and the diaphragm layer may comprise silicon. The piezoresistive element may have a P– conductivity type. The pressure transducer may further comprise a second terminal coupled to the test structure. The test structure and the first conductive element may form a charge test transistor in the diaphragm layer, and wherein the accumulation of surface charge on the surface of the diaphragm layer forms a channel region between the test structure and the conductive element.

In another embodiment, there is provided, a pressure transducer comprising: a substrate having a surface and a cavity; an oxide layer formed on the surface of the substrate; a diaphragm layer formed over the cavity and over the oxide layer; a plurality of piezoresistive elements implanted in the diaphragm layer; a plurality of conductive elements implanted in the diaphragm layer, the plurality of conductive elements having a first conductivity type, and each of the plurality of conductive elements coupled to corresponding ones of the plurality of piezoresistive elements; a test structure having the first conductivity type and formed in the diaphragm layer, the test structure having an edge spaced apart from an edge of a conductive element of the plurality of conductive elements by a predetermined distance, wherein a surface charge accumulation over a surface of the diaphragm layer is detected using the test structure. The first conductivity type may be a P+ conductivity type. The plurality of piezoresistive elements may comprise a plurality of pairs of piezoresistive elements. The plurality of piezoresistive elements may be coupled together to form a resistance bridge using the plurality of conductive elements. The pressure transducer may further comprise a test pad coupled to the test structure. The diaphragm layer may have a second conductivity type different from the first conductivity type. The surface charge accumulation may be measured by measuring one of a resistance, a current, or a voltage between the test structure and the conductive element of the plurality of conductive elements.

In yet another embodiment, there is provided, a pressure transducer comprising: a substrate having a surface and a cavity; an oxide layer formed on the surface of the substrate; a diaphragm layer formed over the cavity and over the oxide layer, the diaphragm layer having a first conductivity type; a plurality of piezoresistive elements implanted in the diaphragm layer; a plurality of conductive elements implanted in the diaphragm layer, the plurality of conductive elements having a second conductivity type, and each of the plurality of conductive elements coupled to corresponding ones of the plurality of piezoresistive elements, wherein the plurality of piezoresistive elements are coupled together using the plurality of conductive elements to form a resistance bridge; a test structure having the second conductivity type and formed in the diaphragm layer, the test structure having an edge spaced apart from an edge of a conductive element of the plurality of conductive elements by a predetermined distance, wherein a surface charge accumulation over a surface of the diaphragm layer is detected using the test structure; a plurality of pads coupled to selected ones of the plurality of conductive elements; and a test pad coupled to the test structure. The first conductivity type may be N-type and the second conductivity type is P-type. The diaphragm layer may comprise silicon. The surface charge accumulation may be measured by measuring one of a resistance, a current, or a voltage between the test structure and the conductive element of the plurality of conductive elements.

FIG. 1 illustrates a top down view of prior art pressure transducer 10. Pressure transducer 10 is formed on semiconductor substrate 12 and includes diaphragm 14 formed in a diaphragm layer over a cavity in substrate 12. Typically, the cavity is sealed at a known pressure, for example, a vacuum. The diaphragm layer can be formed from any semiconductor material or combinations of materials, such as gallium arsenide, silicon germanium, silicon-on-insulator (SOI), silicon, monocrystalline silicon, the like, and combinations of the above. A plurality of piezoresistive elements organized as pairs of piezoresistive elements 15, 17, 19, and 21 are formed on diaphragm 14 in a predetermined arrangement. By way of example, piezoresistive pair 15 includes piezoresistive elements 16 and 18. P+ areas implanted in the surface of N type diaphragm layer, on and around diaphragm 14 function as conductors to couple the pairs of piezoresistive elements 15, 17, 19, and 21 together in a resistance bridge. In another embodiment, the piezoresistive elements may not be organized in pairs. P+ conductive elements 22, 31, 33, and 35 connect ends of both piezoresistive elements of a pair together as illustrated in FIG. 1. For example, conductive element 22 connects an end of piezoresistive element 16 to an end of piezoresistive element 18. Conductive elements 20, 24, 25, 26, 27, 28, 29, and 30 are used to couple the pairs of piezoresistive elements 15, 17, 19, and 21 to pads 26, 28, 30, 32, and 34. The illustrated conductive elements have a particular shape. In other embodiments, the conductive elements may have a different shape. Also, there may be a different number of conductive elements. As illustrated in FIG. 1, the conductive elements and piezoresistive elements are coupled together to form a conventional Wheatstone bridge. Metal conductors are used to couple conductive elements to corresponding pads. For example, pad 28 is coupled to conductive elements 20 and 30 using metal conductor 36. Also, pad 32 is coupled to conductive elements 24 and 25 using metal conductor 38. A sensor signal is read as a voltage between pad 34 labeled "S+" and pad 28 labeled "S−". Pad 26 is labeled "GND" and is coupled to ground, pad 30 is labeled "SUB" and is coupled to the N type diaphragm layer, and pad 32 is coupled to receive a power supply voltage labeled "VDD".

A pressure differential will cause diaphragm 14 to bend in the direction of lower pressure. Piezoresistive element pairs 15, 17, 19, and 21 change their resistance in response the bending. A power supply voltage is provided between pads 32 and 26. Pad 30 is used for biasing the N type diaphragm layer and is preferably coupled to the supply voltage as applied to pad 32. A bending of diaphragm 14 will change at least some of the resistance values of the pairs of piezoresistive elements 15, 17, 19, and 21. A voltage S−/S+ is measured at pads 28 and 34 to provide an indication of the sensed pressure. However, a charge can accumulate on the surface of pressure transducer 10 for various reasons. The charge accumulation affects the voltage difference provided in response to the bending of diaphragm 14, thus leading to erroneous pressure indications.

Figure 2:
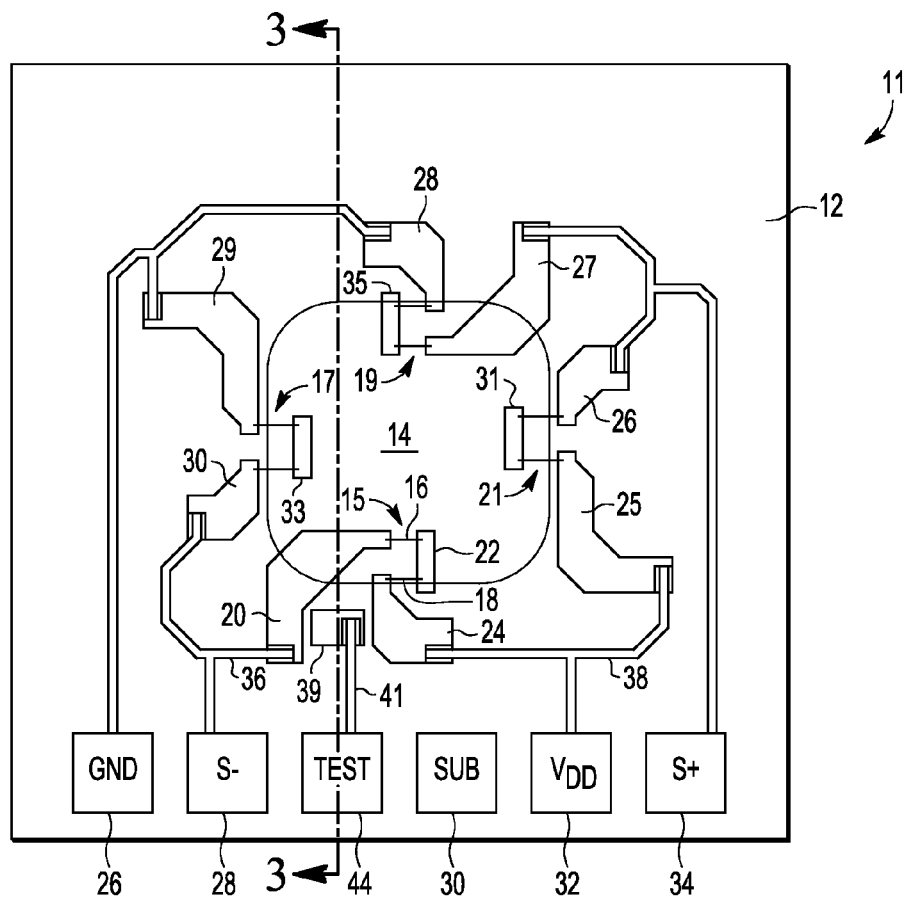
FIG. 2 illustrates a top down view of a pressure transducer in accordance with a first embodiment.

FIG. 2 illustrates a top down view of pressure transducer 11 in accordance with a first embodiment. Pressure transducer 11 is generally the same as pressure transducer 10 except that pressure transducer 11 includes a test structure 39 coupled to a metal test pad 44 via a metal conductor 41. Pads 26, 28, 30, 32, and 34 are provided as discussed above regarding FIG. 1. Because of the additional test pad 44, the other pads 26, 28, 30, 32, and 34 are made smaller and more closely spaced, as compared to pressure transducer 10, so that the size of pressure transducer 11 can remain the same as the size of pressure transducer 10. In the illustrated embodiment, pads 26, 28, 30, 32, 34, and 44 are arranged on one side of pressure transducer 11. In other embodiments, pads 26, 28, 30, 32, 34, and 44 can be arranged in different locations on pressure transducer 11. Also, the pads and conductors may be formed from a different conductive material than metal, such as for example, polysilicon. In addition, a different type of resistor network can be used that require a different number of pads with different functionality.

Test structure 39 is an implanted P+ area that is formed at the same time and in the same manner as P+ conductive elements 20 and 24. An edge of test structure 39 is formed a predetermined distance from an edge of conductive element 20, thus forming a channel region between conductive element 20 and test structure 39. A channel region is also formed between conductive element 24 and test structure 39. In the illustrated embodiment, test structure 39 is not formed on diaphragm 14. In another embodiment, test structure 39 may be formed, at least in part, in diaphragm 14. As charge accumulates on the surface of pressure transducer 11, a change of resistance occurs in the channel region between test structure 39 and conductive element 20 or between test structure 39 and conductive element 24. In one embodiment, an inversion channel region is formed between test structure 39 and the adjacent conductive element. As such, the P+ test structure and adjacent P+ conductive element together form a charge test transistor. The test pad 44 forms a source/drain terminal and one of pads 28 and 32 can form the other source/drain terminal. Note that, while pressure sensor offset shifts may have electrical or mechanical causes, the test structure distinguishes the presence of charge from other influences because there will be essentially no electro-mechanical influence from the pairs of piezoresistive elements in the charge measurement. The change of resistance in the channel region can be measured at test pad 44 and either one of pads 28 and 32. In another embodiment, the accumulation of charge can be detected by measuring a voltage or a current instead of a resistance. Preferably, the predetermined distance provides a shorter channel for the test structure than the channel length of parasitic devices formed between other pairs of conductive elements of the transducer. While a shorter channel is beneficial for producing a larger signal, the test PMOS channel length should be sufficient for easy manufacturability and to prevent punch-through for the relevant voltages. In one embodiment, the channel length may be in the range of 1 to 10 μm (microns). In another embodiment, the channel length may be in the range of 10 to 100 microns. In yet another embodiment, the channel length may be in the range of 1 to 1000 microns. In one embodiment, the measure of charge accumulation is compared to a tolerance value. For example, charge accumulation may be detected by measuring a voltage between pads 44 and 28, or between pads 44 and 32, where pad 44 would be connected to ground via a relatively large resistance as compared to the test structure channel resistance. The accumulation of charge may be indicated as detected when the measured voltage between pads 44 and 28, or between pads 44 and 32, is different than a predetermined tolerance voltage. When charge accumulation is detected, an indication can be provided to the user, or other corrective action can be taken. For example, in the event charge accumulation is detected, the pressure transducer may be recalibrated to provide a correct pressure indication with the accumulated charge.

During operation of pressure transducer 11, testing for charge accumulation can be performed periodically. For example, in one embodiment, a test of charge accumulation can be performed each time pressure transducer 11 is powered up. In another embodiment, charge accumulation can be measured as a final manufacturing step. Also, the location of the test structure is not limited and can be positioned next to any one or more of the conductive elements depending on available space on the surface of the diaphragm layer and on a desired test pad location.

Figure 3:
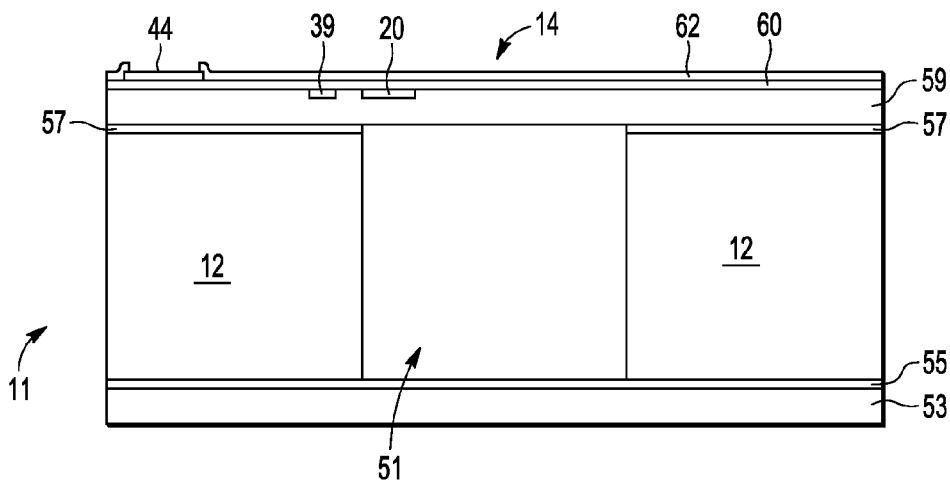
FIG. 3 illustrates a cross-sectional view of the pressure transducer of FIG. 2 along a line 3-3.

FIG. 3 illustrates a cross-sectional view of pressure transducer 11 of FIG. 2 along a line 3-3. A buried oxide layer 57 is formed on a top surface of substrate 12. Substrate 12 is an N-type substrate in the illustrated embodiment. A silicon layer 59 is formed on buried oxide layer 57. In one embodiment, substrate 12, buried oxide layer 57, and silicon layer 59 may be provided as an SOI (silicon-on-insulator) wafer. A cavity 51 is formed in substrate 12. Cavity 51 can be formed by any appropriate semiconductor manufacturing process, such as for example, a wet etch. Diaphragm 14 is a portion of silicon layer 59 over cavity 51. The P+ conductive elements are implanted in silicon layer 59, as illustrated in FIG. 3 by conductive element 20. Test structure 39 is implanted in silicon layer 59 at the same time and using the same implanting step as for conductive element 20. The P-type piezoresistive elements are also formed in silicon layer 59 (not shown in FIG. 3). In one embodiment, the piezoresistive elements are a lower doped P-type implant. For P+ conductive elements and P− piezoresistive elements the silicon layer 59 is preferably N type. Note that in other embodiments, the substrate, the implanted conductive elements, the test structure, and the piezoresistive elements may have a different conductivity type. Moreover, semiconductor materials other than silicon may be used. An insulating layer 60 is formed over silicon layer 59. In one embodiment, insulating layer 60 is grown oxide. A conductive layer is formed over insulating layer 60. The conductive layer may include metal pads, and metal lines for connecting the P+ conductive elements to the metal pads. Pad 44 is illustrated in FIG. 3 as a part of the conductive layer. In one embodiment, the conductive lines may be formed from polysilicon. A passivation layer 62 may then be formed over the top surface of pressure transducer 11 with openings over pads 26, 28, 30, 32, 34, and 44 for allowing an electrical connection. Only pad 44 is illustrated in the cross-sectional view of FIG. 3. Note that passivation layer 62 is not illustrated in the top down view of FIG. 2. Charges may accumulate at the top surface of the diaphragm or silicon layer, within the insulating or passivation layers, or within the package (not shown). Insulating layer 55 is formed on a bottom surface of substrate 12 after forming cavity 51. In one embodiment, insulating layer 55 may be a glass frit. A capping layer 53 is formed on insulating layer 55. Capping layer 53 may be formed from deposited silicon.

Figure 4:
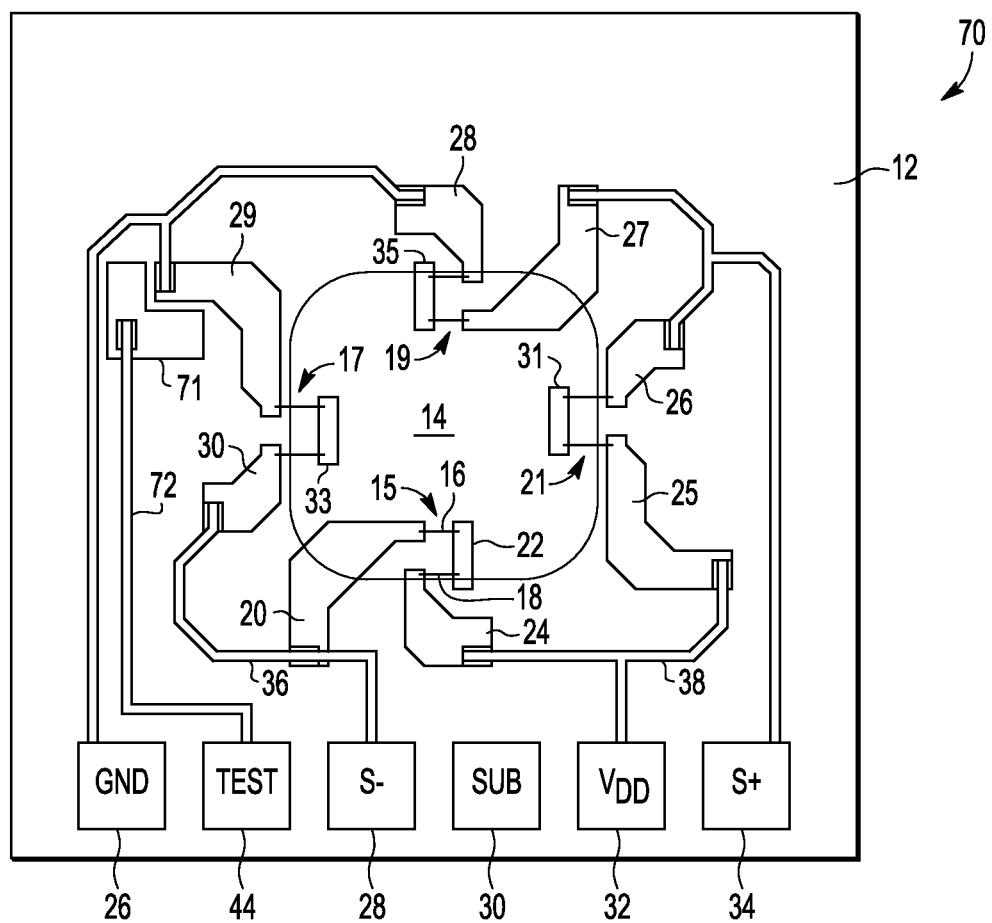
FIG. 4 illustrates a top down view of a pressure transducer in accordance with a second embodiment.
Figure 5:
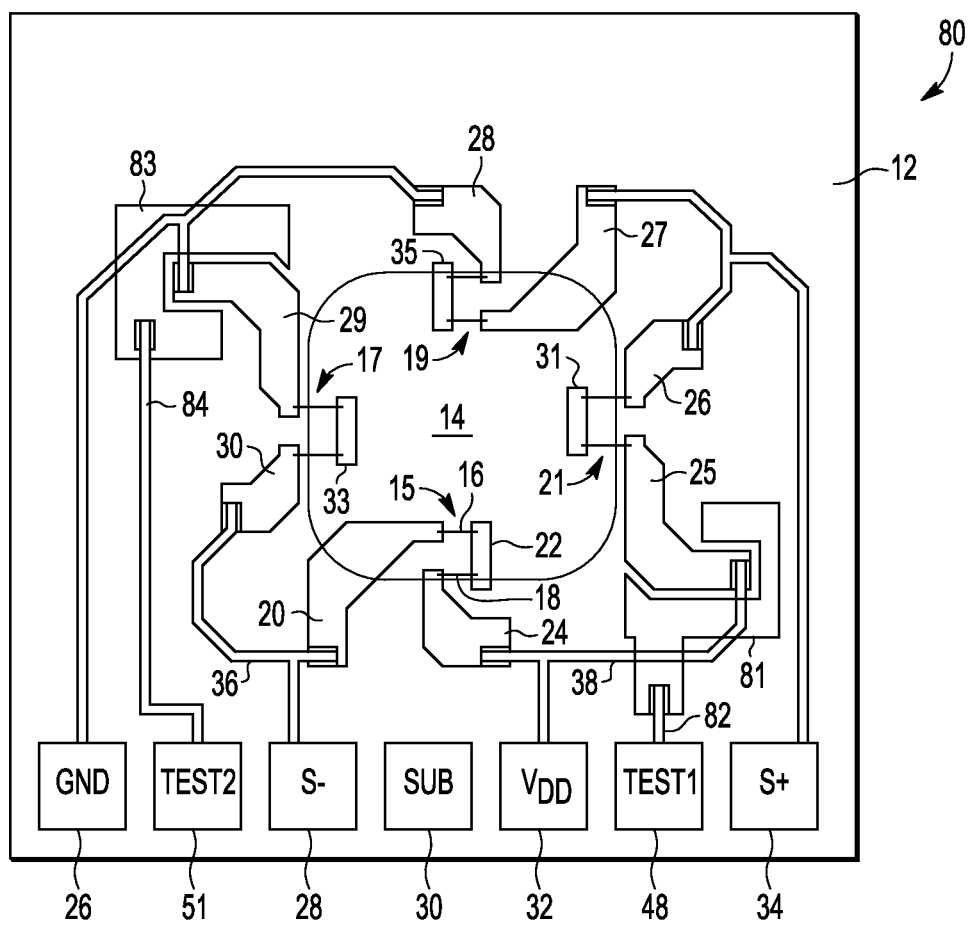
FIG. 5 illustrates a top down view of a pressure transducer in accordance with a third embodiment.
Figure 6:
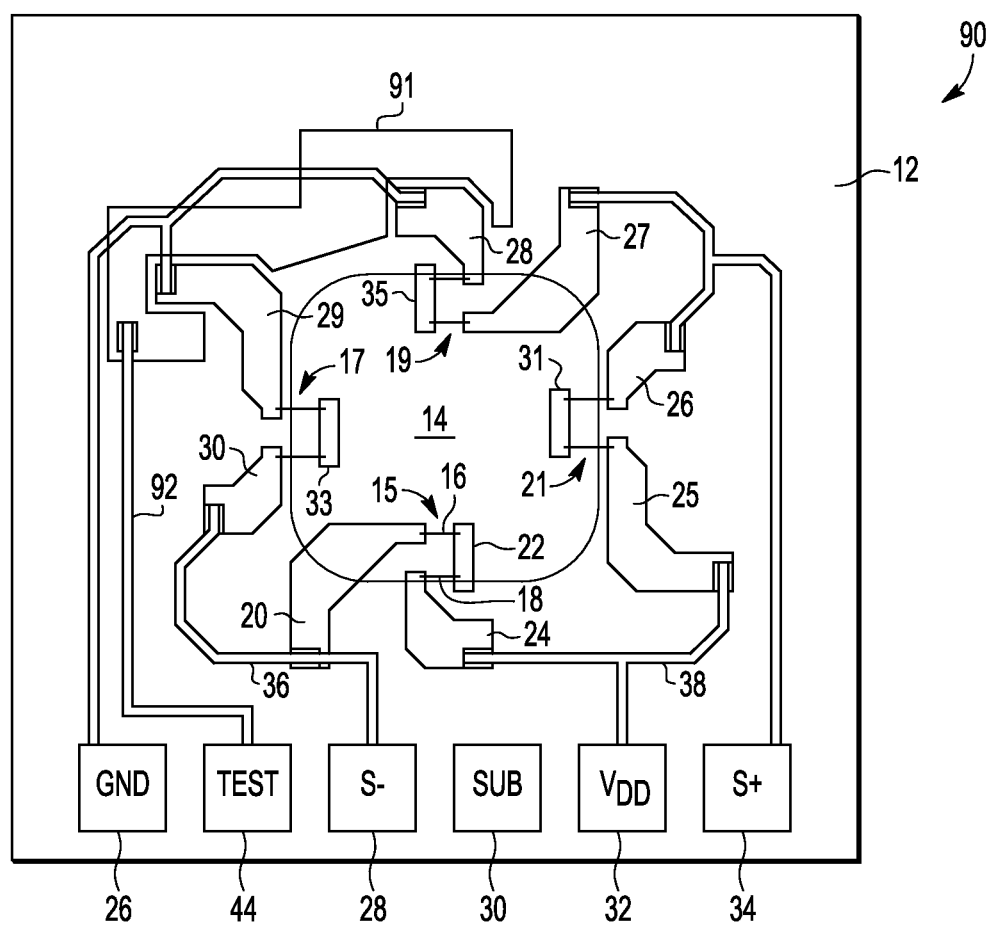
FIG. 6 illustrates a top down view of a pressure transducer in accordance with a fourth embodiment.

FIG. 4, FIG. 5, and FIG. 6 each show different shapes and different locations for the test structure and corresponding test pad.

FIG. 4 illustrates a top down view of pressure transducer 70 in accordance with a second embodiment. Pressure transducer 70 is generally the same as pressure transducer 11, except pressure transducer 70 has a test structure 71 in a different location and having a longer channel width than test structure 39 in FIG. 2. The shape of test structure 71 partially wraps around conductive element 29. Also, the arrangement of the pads of transducer 70 is adjusted with respect to the pads of transducer 11 to accommodate the different test structure location. Test pad 44 is coupled to test structure 71 using metal conductor 72. The channel width of the test structure can be adjusted to provide a useful current level. Also, a longer channel width provides for a more sensitive test measurement of charge accumulation. In addition, a longer channel width reduces the need to account for noise level currents and background piezoresistance when using the test structure.

FIG. 5 illustrates a top down view of pressure transducer 80 in accordance with a third embodiment. Pressure transducer 80 is generally the same as pressure transducer 11, except for the addition of test structures 81 and 83. In FIG. 5, test structure 81 is illustrated wrapping around a portion of conductive element 25, and test structure 83 wraps around conductive element 29. Test structure 81 is coupled to pad 48, labeled "TEST1", by metal conductor 82. Test structure 83 is coupled to pad 51, labeled "TEST2", by metal conductor 84. In order to accommodate the additional test pad as illustrated in FIG. 5, the pads of transducer 70 are rearranged with respect to the pads of transducer 11. Two or more test structures may be used to enhance the sensitivity with respect to inhomogeneous charge distributions on the length scale of the sensor dimensions. During test mode, pads 32 and 48 are biased in a suitable way for forming a PMOS charge test device between conductive elements 25 and 81. Similarly, pads 51 and 26 are used to bias the PMOS charge test structure between conductive elements 29 and 83.

FIG. 6 illustrates a top down view of pressure transducer 90 in accordance with a fourth embodiment. Pressure transducer 90 is generally the same as pressure transducer 70, except for test structure 91. Test structure 91 is illustrated wrapping around conductive elements 28 and 29 to provide an even larger effective channel width. Test structure 91 is coupled to pad 44 by metal conductor 92.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A pressure transducer comprising:
    a substrate having a surface and a cavity, a diaphragm layer formed over the cavity and over the surface of the substrate;
    a piezoresistive element formed in the diaphragm layer;
    a first conductive element formed in the diaphragm layer, the first conductive element having a first conductivity type, and the first conductive element coupled to the piezoresistive element;
    a first terminal formed over the surface of the diaphragm layer and coupled to the first conductive element; and
    a test structure having the first conductivity type and formed in the diaphragm layer, the test structure having an edge spaced apart from an edge of the first conductive element by a predetermined distance, wherein a surface charge accumulation over a surface of the diaphragm layer is detected using the test structure.

2. The pressure transducer of claim 1, wherein the first conductivity type is a P+ conductivity type.

3. The pressure transducer of claim 1, further comprising a second terminal coupled to the test structure, wherein a change in resistance between the first terminal and the second terminal is used to indicate the surface charge accumulation.

4. The pressure transducer of claim 1, further comprising:
    a plurality of piezoresistive elements formed in the diaphragm layer; and
    a plurality of conductive elements for electrically connecting the plurality of piezoresistive elements in a resistive bridge configuration.

5. The pressure transducer of claim 4, wherein the plurality of piezoresistive elements comprises a plurality of pairs of piezoresistive elements.

6. The pressure transducer of claim 1, wherein the substrate and the diaphragm layer comprise silicon.

7. The pressure transducer of claim 1, wherein the piezoresistive element has a P-conductivity type.

8. The pressure transducer of claim 1, further comprising a second terminal coupled to the test structure.

9. The pressure transducer of claim 1, wherein the test structure and the first conductive element form a charge test transistor in the diaphragm layer, and wherein the accumulation of surface charge on the surface of the diaphragm layer forms a channel region between the test structure and the conductive element.

10. A pressure transducer comprising:
    a substrate having a surface and a cavity;
    an oxide layer formed on the surface of the substrate;
    a diaphragm layer formed over the cavity and over the oxide layer;
    a plurality of piezoresistive elements implanted in the diaphragm layer;
    a plurality of conductive elements implanted in the diaphragm layer, the plurality of conductive elements having a first conductivity type, and each of the plurality of conductive elements coupled to corresponding ones of the plurality of piezoresistive elements;
    a test structure having the first conductivity type and formed in the diaphragm layer, the test structure having an edge spaced apart from an edge of a conductive element of the plurality of conductive elements by a predetermined distance, wherein a surface charge accumulation over a surface of the diaphragm layer is detected using the test structure.

11. The pressure transducer of claim 10, wherein the first conductivity type is a P+ conductivity type.

12. The pressure transducer of claim 10, wherein the plurality of piezoresistive elements comprise a plurality of pairs of piezoresistive elements.

13. The pressure transducer of claim 10, wherein the plurality of piezoresistive elements are coupled together to form a resistance bridge using the plurality of conductive elements.

14. The pressure transducer of claim 10, further comprising a test pad coupled to the test structure.

15. The pressure transducer of claim 10, wherein the diaphragm layer has a second conductivity type different from the first conductivity type.

16. The pressure transducer of claim 10, wherein the surface charge accumulation is measured by measuring one of a resistance, a current, or a voltage between the test structure and the conductive element of the plurality of conductive elements.

17. A pressure transducer comprising:
    a substrate having a surface and a cavity;
    an oxide layer formed on the surface of the substrate;

a diaphragm layer formed over the cavity and over the oxide layer, the diaphragm layer having a first conductivity type;

a plurality of piezoresistive elements implanted in the diaphragm layer;

a plurality of conductive elements implanted in the diaphragm layer, the plurality of conductive elements having a second conductivity type, and each of the plurality of conductive elements coupled to corresponding ones of the plurality of piezoresistive elements, wherein the plurality of piezoresistive elements are coupled together using the plurality of conductive elements to form a resistance bridge;

a test structure having the second conductivity type and formed in the diaphragm layer, the test structure having an edge spaced apart from an edge of a conductive element of the plurality of conductive elements by a predetermined distance, wherein a surface charge accumulation over a surface of the diaphragm layer is detected using the test structure;

a plurality of pads coupled to selected ones of the plurality of conductive elements; and a test pad coupled to the test structure.

18. The pressure transducer of claim 17, wherein the first conductivity type is N-type and the second conductivity type is P-type.

19. The pressure transducer of claim 17, wherein the diaphragm layer comprises silicon.

20. The pressure transducer of claim 17, the surface charge accumulation is measured by measuring one of a resistance, a current, or a voltage between the test structure and the conductive element of the plurality of conductive elements.

* * * * *